(12) United States Patent
Oishi

(10) Patent No.: US 8,331,683 B2
(45) Date of Patent: Dec. 11, 2012

(54) IMAGE PROCESSING APPARATUS AND IMAGE PROCESSING METHOD

(75) Inventor: Tetsu Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 12/368,633

(22) Filed: Feb. 10, 2009

(65) Prior Publication Data

US 2009/0214119 A1 Aug. 27, 2009

(30) Foreign Application Priority Data

Feb. 21, 2008 (JP) ................. 2008-040555

(51) Int. Cl.
G06K 9/46 (2006.01)
(52) U.S. Cl. ...................................... 382/190
(58) Field of Classification Search .................. 382/190, 382/258
See application file for complete search history.

(56) References Cited

U.S. PATENT DOCUMENTS

| 5,054,099 A | * | 10/1991 | Wakabayashi et al. | 382/298 |
| 5,146,511 A | * | 9/1992 | Shirasaki | 382/197 |
| 5,485,288 A | * | 1/1996 | Kamei et al. | 358/530 |
| 7,200,268 B2 | * | 4/2007 | Ishizuka et al. | 382/202 |
| 7,443,538 B2 | * | 10/2008 | Hasegawa | 358/1.9 |

FOREIGN PATENT DOCUMENTS

| JP | 10-188011 A | 7/1998 |
| JP | 2001-203892 A | 7/2001 |

* cited by examiner

Primary Examiner — Daniel Mariam
(74) Attorney, Agent, or Firm — Canon USA Inc IP Division

(57) ABSTRACT

An image processing apparatus has an extraction unit configured to extract a thin line with a width of equal to or less than a predetermined value from rendering data, and an end point processing unit configured to displace, with respect to a portion that satisfies a predetermined condition in the thin line, at least one of end points of the portion within a predetermined range.

16 Claims, 18 Drawing Sheets

FIG. 6
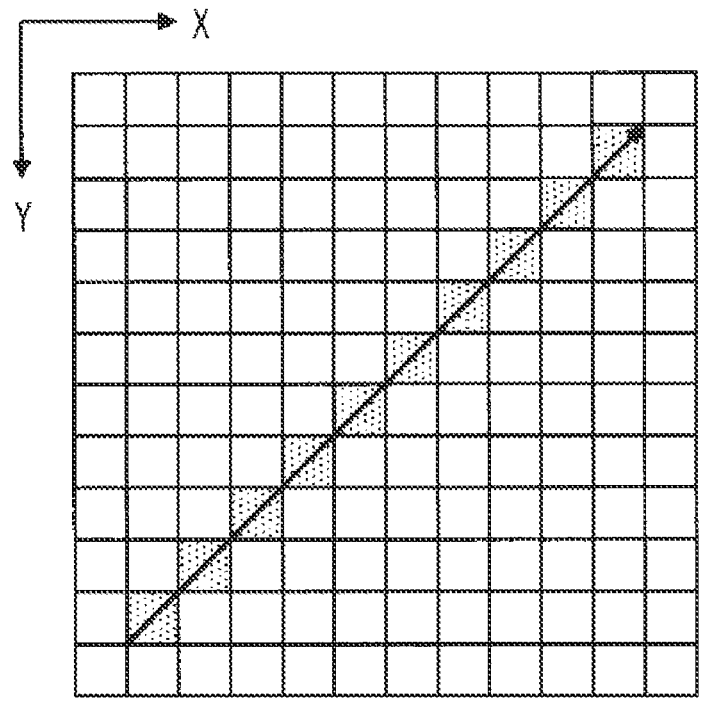
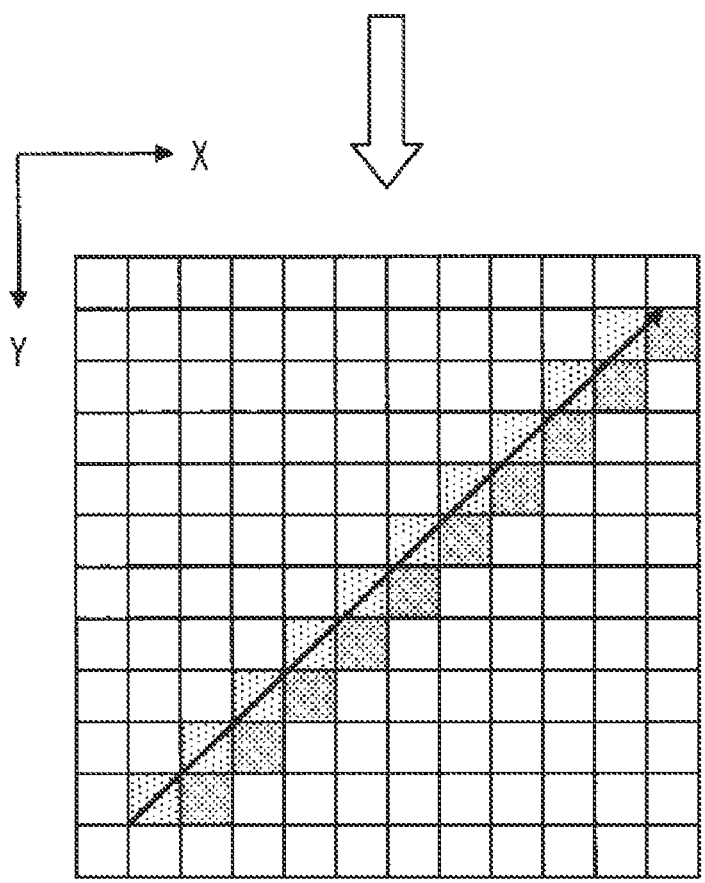

WITHOUT ROTATION

WITH 180° ROTATION

WITHOUT ROTATION

WITH 90° ROTATION

WITH 180° ROTATION

WITH 270° ROTATION

FIG. 18
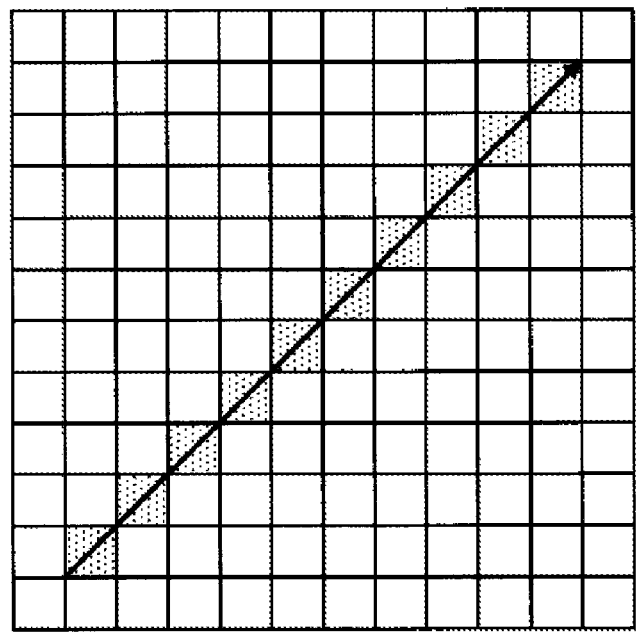
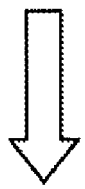
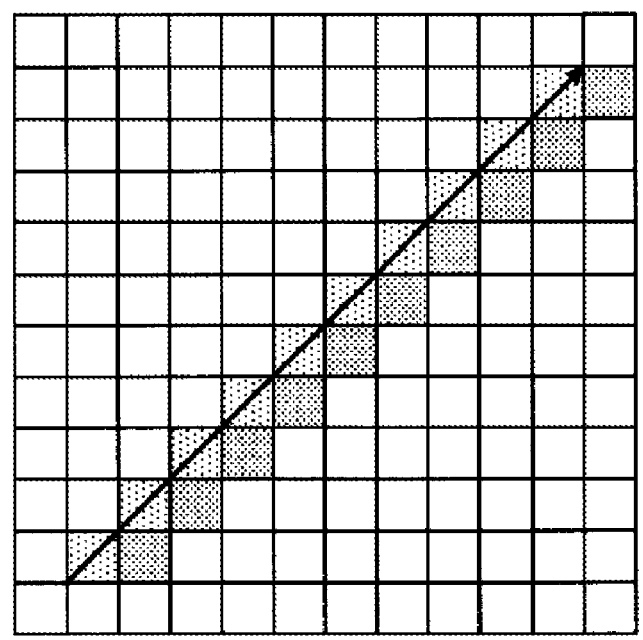

IMAGE PROCESSING APPARATUS AND IMAGE PROCESSING METHOD

BACKGROUND OF THE INVENTION

1. Field of the Invention

The present invention relates to an image processing apparatus and an image processing method which are suitable for an information processing system, such as a personal computer.

2. Description of the Related Art

In recent years, opportunities to print thin lines have increased along with a widespread use of computer aided design (CAD) software and the like. Generally, a line is rendered by inputting a starting coordinate point, an ending coordinate point, a line width and a color, and outputting binary image data by performing rendering processing according to a fill-rule. As the fill-rule, a graphics device interface (GDI) system adopted by Windows (Trademark), and a post script (PS) system adopted by Adobe are generally used. Japanese Patent Application Laid-Open No. 2001-203892, for example, discusses how to thicken an image.

A thin line has a very thin line width. The line width of the thin line is often set at a minimum value that a real machine can render. As an effective rendering method for the thin line, a PostScript Edge system exists. The PostScript Edge system renders all dots through which a line passes. FIG. 13 illustrates a rendering method for the thin line by the PostScript Edge system. In the PostScript Edge system, all dots through which a line connecting from a starting point (S) to an ending point (E) passes are rendered. More specifically, dots D101, D102, D103, D104, and the like through which a line segment SE passes are rendered. Positions of the starting point and the ending point are not needed to be integers on grids, and can be specified by decimal values.

However, the PostScript Edge system, that is the effective rendering method for the thin line, has a problem as follows.

In the PostScript Edge system, a line width of a thin line with an angle of inclination from a horizontal axis of 45 degrees or 135 degrees is different depending on whether or not the line passes through X-coordinates and Y-coordinates (i.e., grid points) of integer numbers. For example, in a thin 45-degree line illustrated in FIG. 14 that does not pass through grid points, since there are two dots through which a line passes for each Y-coordinate, the thickness of the thin line has two dots in an X-direction. In contrast, in the thin 45-degree line illustrated in FIG. 15 that passes through the grid points, since a number of dots through which the line passes for each Y-coordinate is only one, the thickness of the thin line becomes one dot in the X-direction. Accordingly, when comparing these two lines, their thickness is different. In particular, as illustrated in FIG. 16, when a plurality of thin 45-degree lines are rendered, differences of thickness are remarkable and it seems as if a kind of a pattern would have been drawn.

The difference of thickness between thin lines may appear in not only rendering of a line segment but also in rendering of a curve such as a circle, as illustrated in FIG. 17. In other words, a width of the thin line may become thinner at a portion where an angle of inclination thereof is close to 45 degrees or 135 degrees from the horizontal axis, than other portions.

There is a method in which, when a thin line is rendered by the PostScript Edge system, it is determined whether the thin line to be rendered is a thin 45-degree (135-degree) line and passes through grid points, and then the thin line is rendered based on a determined result. In this method, if the above-described two conditions are satisfied, as illustrated in FIG. 18, one dot is added to each Y-coordinate. According to this method, even with respect to the thin line that has an angle of inclination of 45 degrees (135 degrees) and passes through grid points, thickness of the line becomes equivalent to the thin 45-degree (135-degree) line that does not pass through grid points by additional rendering of one dot.

However, since two determination processes are necessary for the conventional method as described above, its operation becomes troublesome. Also, executing these processes put a burden on an information processing device or the like.

SUMMARY OF THE INVENTION

The present invention is directed to an image processing apparatus and an image processing method that can uniformly and easily represent thickness of a thin line.

According to an aspect of the present invention, an image processing apparatus includes an extraction unit configured to extract a thin line with a width of equal to or less than a predetermined value from rendering data, and an end point processing unit configured to displace, with respect to a portion that satisfies a predetermined condition in the thin line, at least one of end points of the portion within a predetermined range.

According to another aspect of the present invention, a method for processing an image includes extracting a thin line with a width of equal to or less than a predetermined value from rendering data, and displacing, with respect to a portion that satisfies a predetermined condition in the thin line, at least one of end points of the portion within a predetermined range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 are diagrams illustrating a result of rendering of a thin line.

FIG. 18 is a diagram illustrating conventional processing to be performed for a thin 45-degree line that passes through grid points.

DETAILED DESCRIPTION OF THE EMBODIMENTS

Various exemplary embodiments, features, and aspects of the invention will be described in detail below with reference to the drawings.

Figure 1:
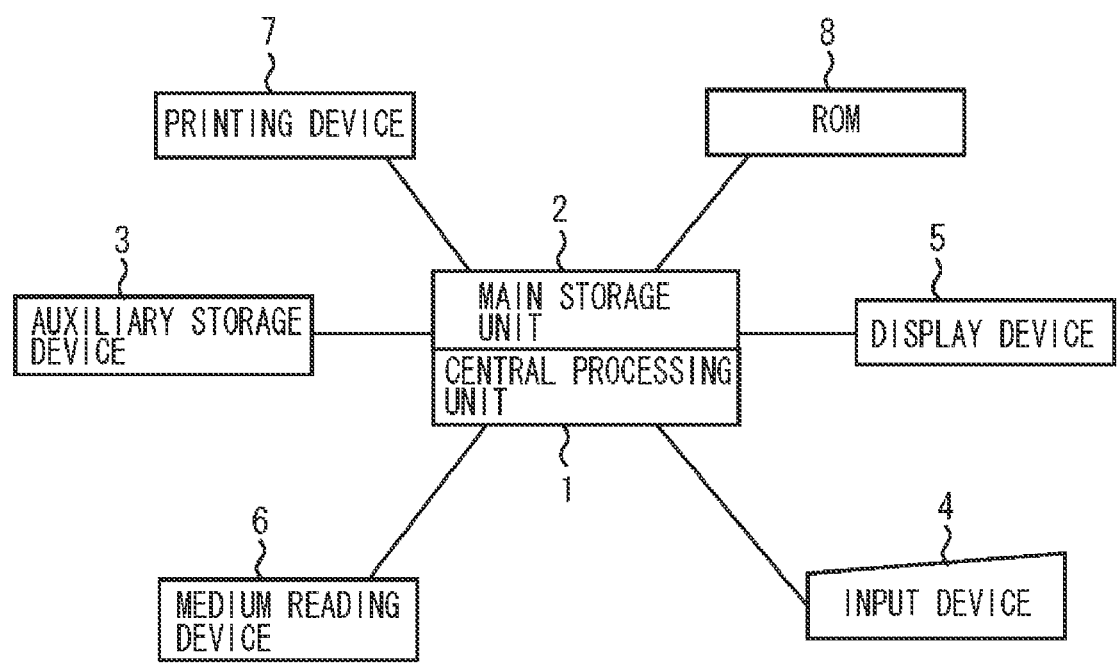
FIG. 1 is a diagram illustrating a configuration of an information processing system according to an exemplary embodiment of the present invention.

FIG. 1 is a diagram illustrating a configuration of an information processing system according to an exemplary embodiment of the present invention.

Figure 2:
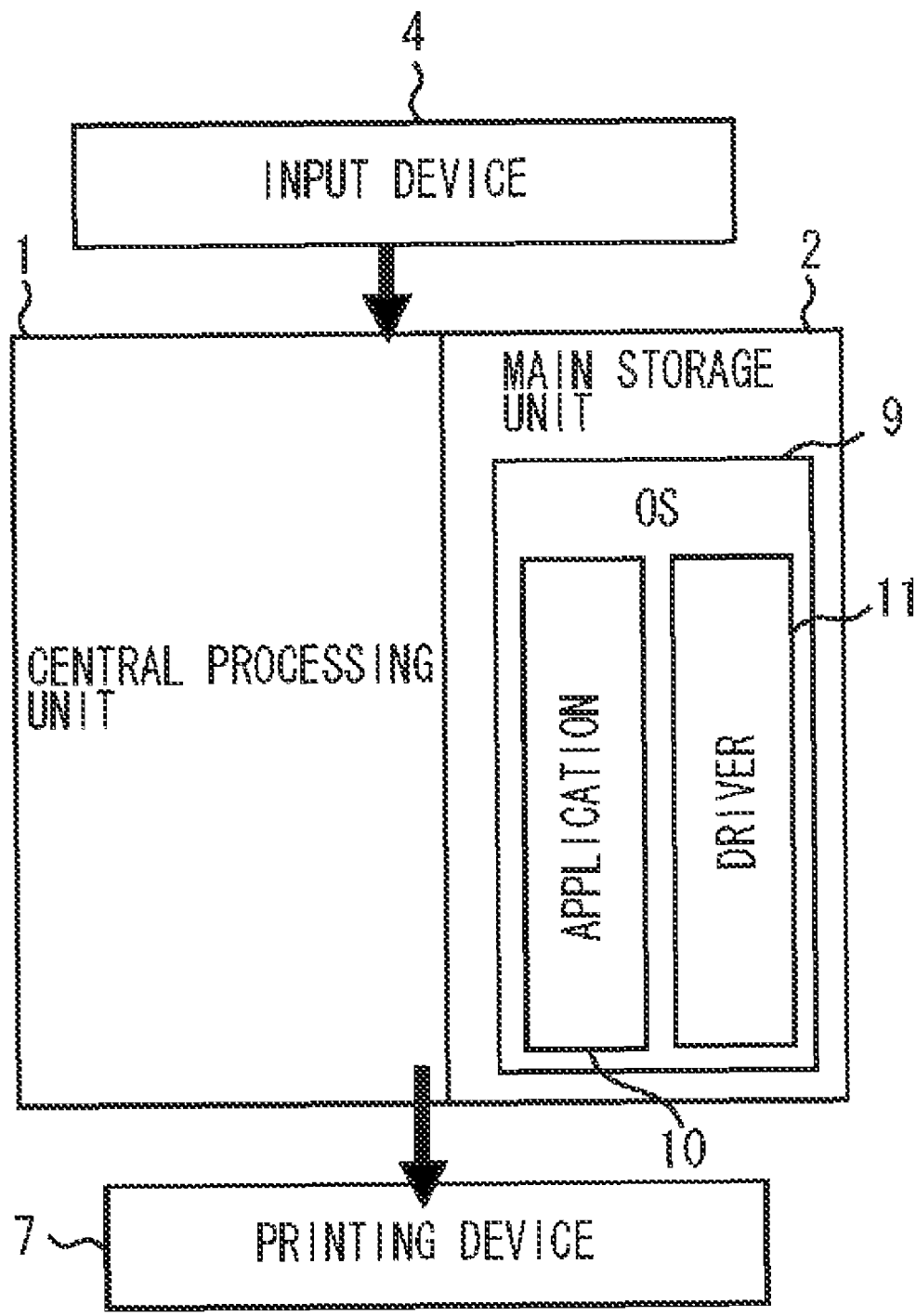
FIG. 2 is a diagram illustrating a relationship among a central processing unit, a main storage unit, an input device, and a printing device.

The information processing system includes a central processing unit 1, a main storage unit 2, an auxiliary storage device 3, an input device 4, a display device 5, a medium reading device 6, a printing device 7 and a read-only memory (ROM) 8. FIG. 2 illustrates a relationship among the central processing unit 1, the main storage unit 2, the input device 4 and the printing device 7. The information processing system functions as an image processing apparatus.

The central processing unit 1 reads various programs and data recorded in a recording medium (computer-readable storage medium) such as a flexible disk, a compact disk-read only memory (CD-ROM), an IC memory card, etc. via the medium reading device 6. Also, the central processing unit 1 processes information input from the input device 4 according to an operating system (OS) 9, an application program 10 and a printer driver 11 that have been loaded on the main storage unit 2. Then, the central processing unit 1 outputs the processed information to the display device 5 and the printing device 7, and the like. The OS 9, the application program 10 and the printer driver 11 are loaded from the auxiliary storage device 3, for example. As the auxiliary storage device 3, a hard disk and a magneto optical disk, for example, are used singly or in combination. The devices may be connected each other via a network. As the input device 4, a keyboard and a pointing device, for example, are used singly or in combination. The OS 9, the application program 10 and the printer driver 11 are stored in the ROM 8 for example.

As illustrated in FIG. 2, for example, a print order that is input from the input device 4 is processed by the central processing unit 1 using the application program 10 and the printer driver 11, and output to the printing device 7. At this time, the application program 10 and the printer driver 11 work under the control of the OS 9.

Figure 3:
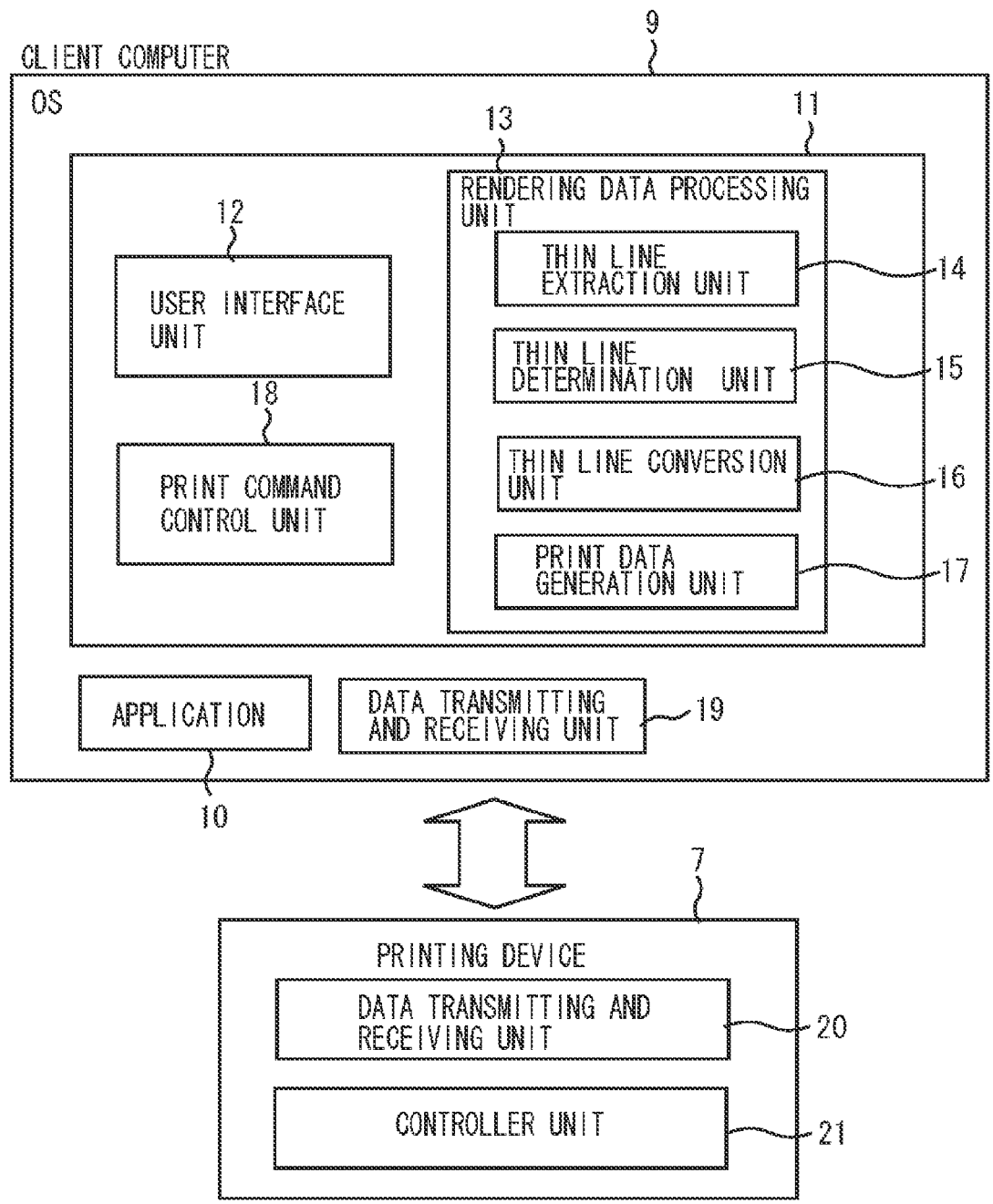
FIG. 3 is a functional block diagram illustrating a functional configuration of a client computer.

A client computer equipped with the central processing unit 1 and the main storage unit 2 will be described. FIG. 3 is a functional block diagram illustrating a functional configuration of the client computer.

As described above, the application program 10 and the printer driver 11 work under the control of the OS 9. The printer driver 11 includes a user interface unit 12, a rendering data processing unit 13 and a print command control unit 18. Further, the rendering data processing unit 13 includes a thin line extraction unit 14, a thin line determination unit 15, a thin line conversion unit 16, and a print data generation unit 17. In addition, an end point processing unit includes the thin line determination unit 15 and the thin line conversion unit 16.

The user interface unit 12 allows a user to input various print settings to the printing device 7, and to input a print start instruction. The rendering data processing unit 13 receives a rendering order specified by the application program 10, and generates data that can be processed in the printing device 7. The thin line extraction unit 14 extracts a thin line from rendering data included in the rendering order.

The thin line determination unit 15 determines whether the thin line extracted by the thin line extraction unit 14 satisfies a predetermined condition. For example, the thin line determination unit 15 determines whether an angle of inclination of the thin line is 45 degrees or 135 degrees from a specific reference axis (horizontal axis).

The thin line conversion unit 16 performs processing to displace one of two end points of the thin line that is determined by the thin line determination unit 15 to satisfy the predetermined condition by a predetermined amount in a predetermined direction. For example, the thin line conversion unit 16 performs the processing to displace one end point which has a smaller coordinate in a vertical axis direction (Y-axis direction) of two end points within a predetermined range in the horizontal axis direction (X-axis direction). For example, the thin line conversion unit 16 displaces the end point by a minimum unit that can be specified. When an integer part of 28 bits and a decimal part of 4 bits may be used to represent a decimal fraction, the minimum unit is $1/16$ that is minus fourth power of 2. The minimum unit varies depending on data format that represents the decimal fraction.

The print data generation unit 17 performs rendering by using a dither, and generates bit map data as print data. Further, the print data generation unit 17 performs rendering of a thin line portion according to the PostScript Edge rule. The print command control unit 18 converts the print data generated by the print data generation unit 17 to a print command compatible with the printing device 7. The print command control unit 18 performs entire control of the print command.

In the OS 9, a data transmitting and receiving unit 19 is included as a part of a function of the OS 9, and the data transmitting and receiving unit 19 transmits and receives data to/from the data printing device 7 by Centronics connection.

On the other hand, the printing device 7 includes a data transmitting and receiving unit 20 and a controller unit 21. The data transmitting and receiving unit 20 transmits and receives data to/from the client computer. The controller unit 21 controls a printer engine (not shown) based on the data that the data transmitting and receiving unit 20 receives.

Figure 4:
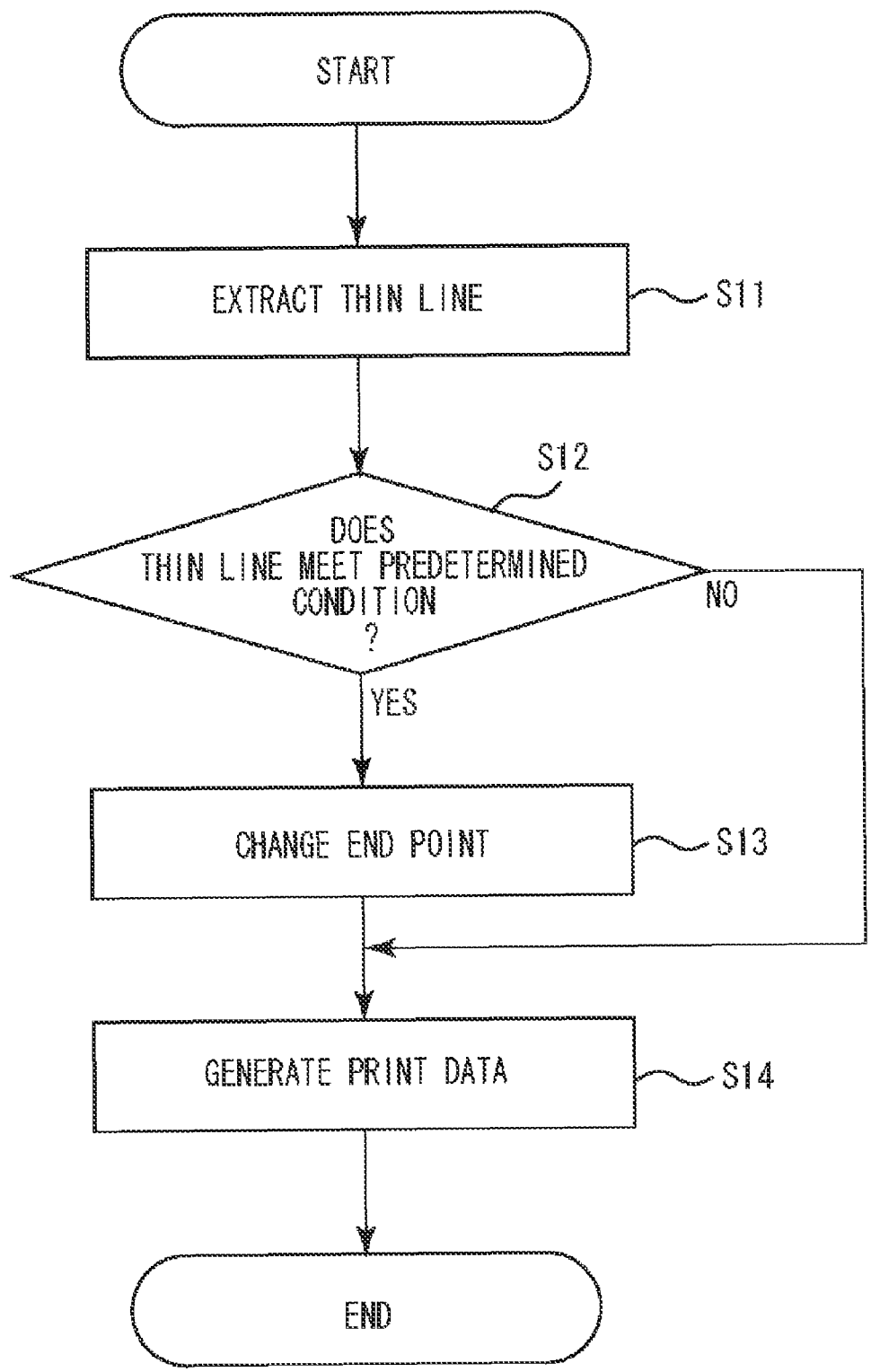
FIG. 4 is a flowchart illustrating a rendering method of a thin line.
Figure 5:
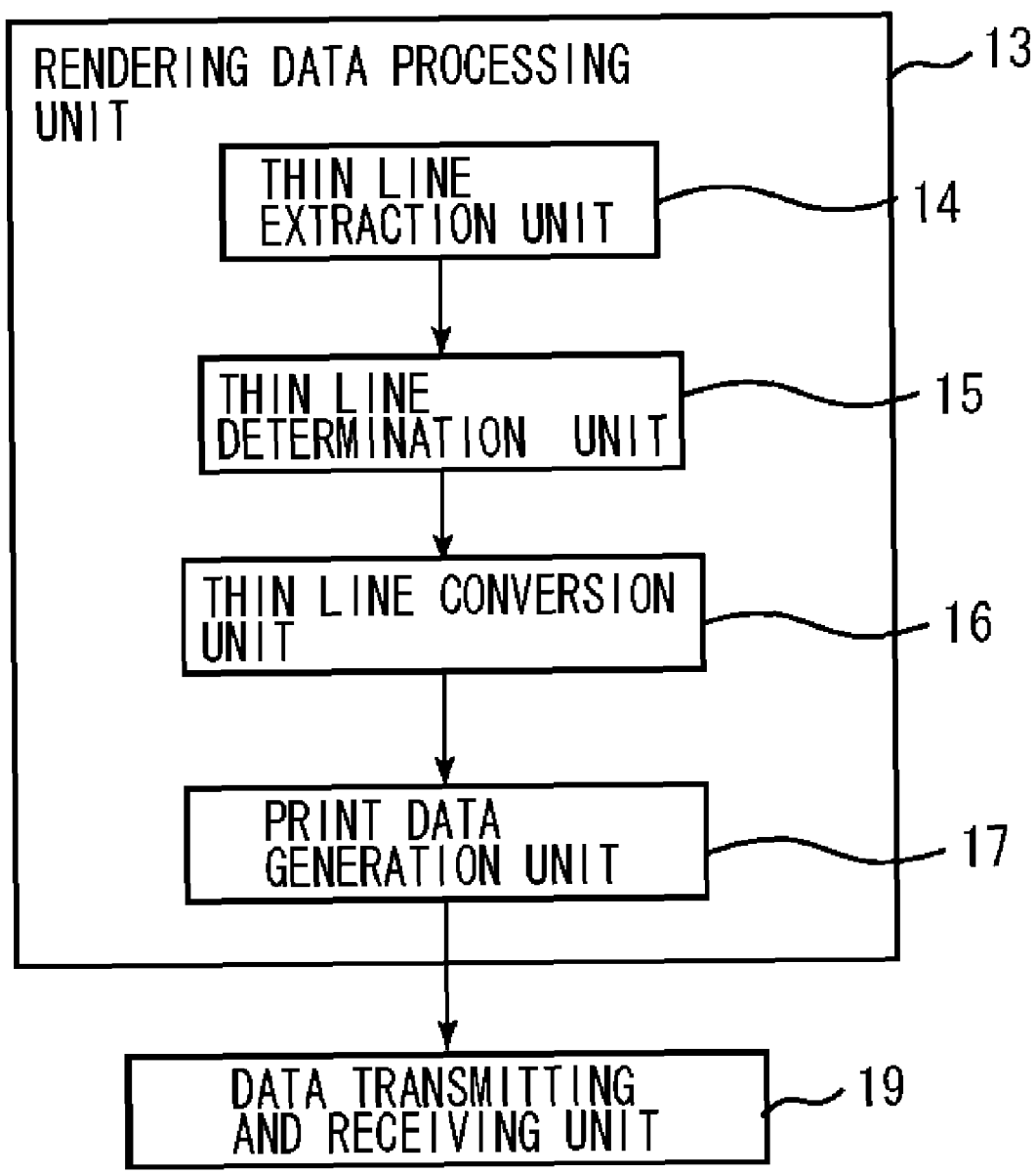
FIG. 5 is a diagram illustrating a flow of data when rendering a thin line.

Next, a rendering method of a thin line in the information processing system having the above described configuration will be described. FIG. 4 is a flowchart illustrating the rendering method of the thin line. FIG. 5 is a diagram illustrating the flow of data upon rendering the thin line.

First, when an order to execute print is input from the input device 4, the OS 9 that is read from the auxiliary storage device 3 onto the main storage unit 2 receives the print order. The OS 9 sends the print order to the application program 10 that has been activated at that point.

When the print order is received, the application program 10 converts the print order to a command that can be recognized by the OS 9 and sends data to be printed and a message of the command to the OS 9. The OS 9 converts the message to a command that can be recognized by the printer driver 11, and sends the command to the printer driver 11. The data to be printed is rendering data which is generated according to an input of the order by the user via the input device 4 during execution of the application program 10, for example.

When the received command includes an initialization command, the printer driver 11 executes following processes based on a setting made via the user interface unit 12 or a default setting.

In step S11, the thin line extraction unit 14 extracts a thin line from the rendering data that is sent by the application program 10. When the thin line is extracted, the thin line extraction unit 14 extracts a line with width of equal to or less than a predetermined value as the thin line. The predetermined value (threshold value) is, for example, either set by default, or set by the user via the user interface unit 12. Thinness of the thin line that the printing device can render is dependent on a capability thereof. The higher resolution the printing device 7 has, the thinner line can be rendered. Therefore, the capability of the printing device 7 affects the threshold value of the thin line. For example, a printer with 600 dpi would take a line of one dot as a thin line, and a printer with 1200 dpi would take a line of two dots as a thin line.

Next, in step S12, the thin line determination unit 15 determines whether the thin line extracted by the thin line extraction unit 14 satisfies the predetermined condition. More specifically, the thin line determination unit 15 determines whether the angle of inclination of the thin line is 45 degrees or 135 degrees from the specific reference axis (horizontal axis).

If the thin line determination unit 15 determines that the predetermined condition is not satisfied (NO in step S12), then in step S14, the print data generation unit 17 generates bit map data as print data from the rendering data as it is. Then, the data transmitting and receiving unit 19 transmits the print data to the printing device 7.

On the other hand, if the thin line determination unit 15 determines that the predetermined condition is satisfied (YES in step S12), then in step S13, the thin line conversion unit 16 performs processing to displace one end point of the thin line. For example, the thin line conversion unit 16 performs the processing to displace one end point which has the smaller coordinate in the vertical axis direction (Y-axis direction) of the two end points by 1/16 of a basic unit of a grid in a positive direction (X-axis direction) of the horizontal axis. Then, in step S14, the print data generation unit 17 generates the bit map data as the print data from the processed rendering data. Then, the data transmitting and receiving unit 19 transmits the print data to the printing device 7.

According to the present exemplary embodiment, it is possible to cause the printing device 7 to render a thin line with a predetermined thickness without being affected by an angle of inclination and a position. In other words, the position of the one end point is displaced, as illustrated in FIG. 6, so that most portions of the thin line do not pass through grid points. Accordingly, dots to be rendered will increase and a line width is thickened. Therefore, the thickness of the thin line whose angle of inclination is not 45 degrees or 135 degrees and that of the thin line which has the angle of inclination of 45 degrees or 135 degrees and does not pass through the grid points can be similar. As a result, thickness of the entire thin line will be uniformed.

In the present exemplary embodiment, a troublesome determination whether a thin 45-degree line and a thin 135-degree line pass through the grid points is not needed. Therefore, in comparison with the conventional method, rendering can be easily executed, and a load of devices can be reduced. For the thin 45-degree line and the thin 135-degree line that do not pass through the grid points, the processing to displace one end point is executed, but an amount of displacement is a minimum unit that can be specified, so that an adverse effect that a rendered line becomes abnormally too thick hardly occurs.

In this manner, according to the present exemplary embodiment, a thin 45-degree line and a thin 135-degree line can be easily thickened and naturally represented in the PostScript Edge system.

A target end point to be displaced of two end points of a thin line is not particularly limited to one of two end points but either of a starting point or an ending point may be displaced by converting coordinates thereof. Also, these both points may be displaced.

Figure 7:
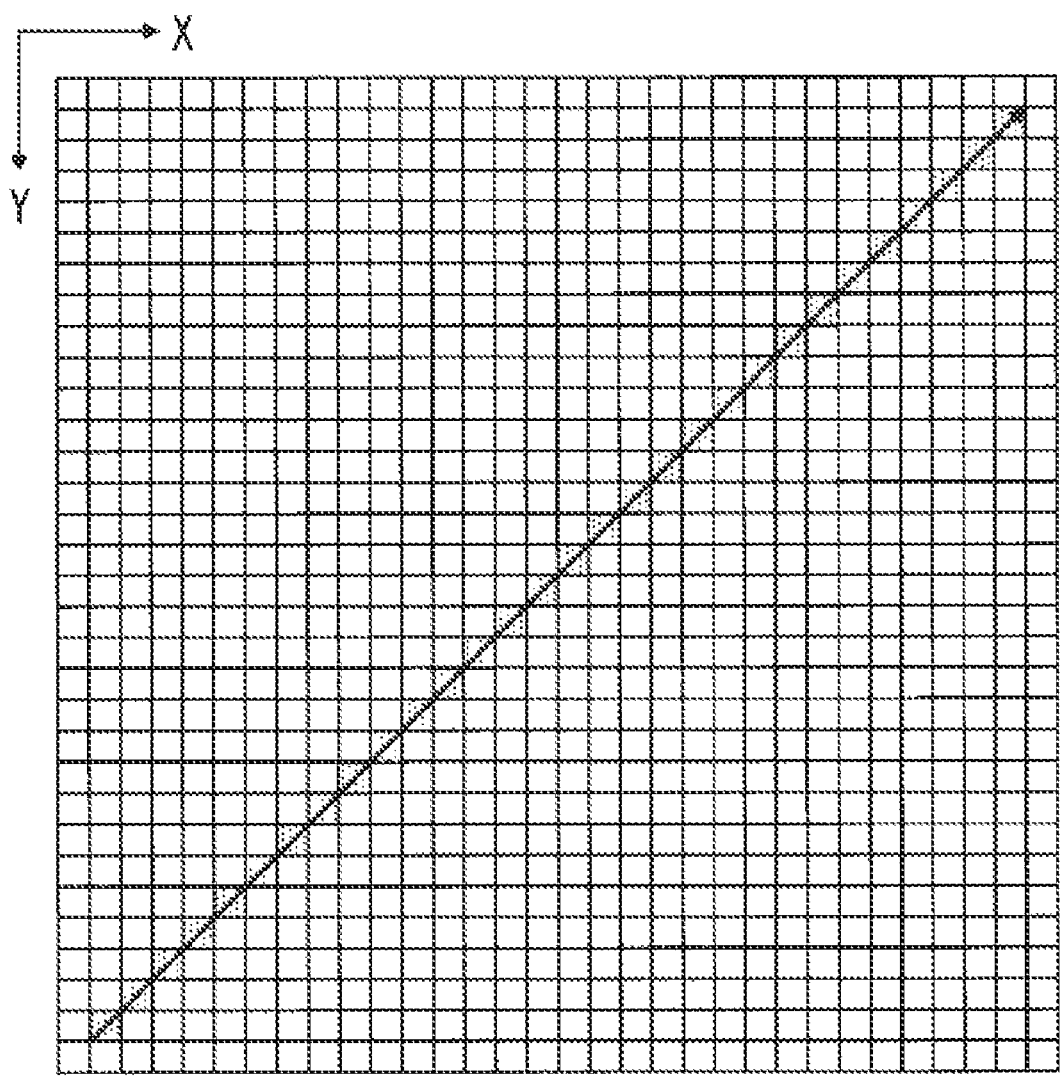
FIG. 7 is a diagram illustrating an example of a large-format print.
Figure 8:
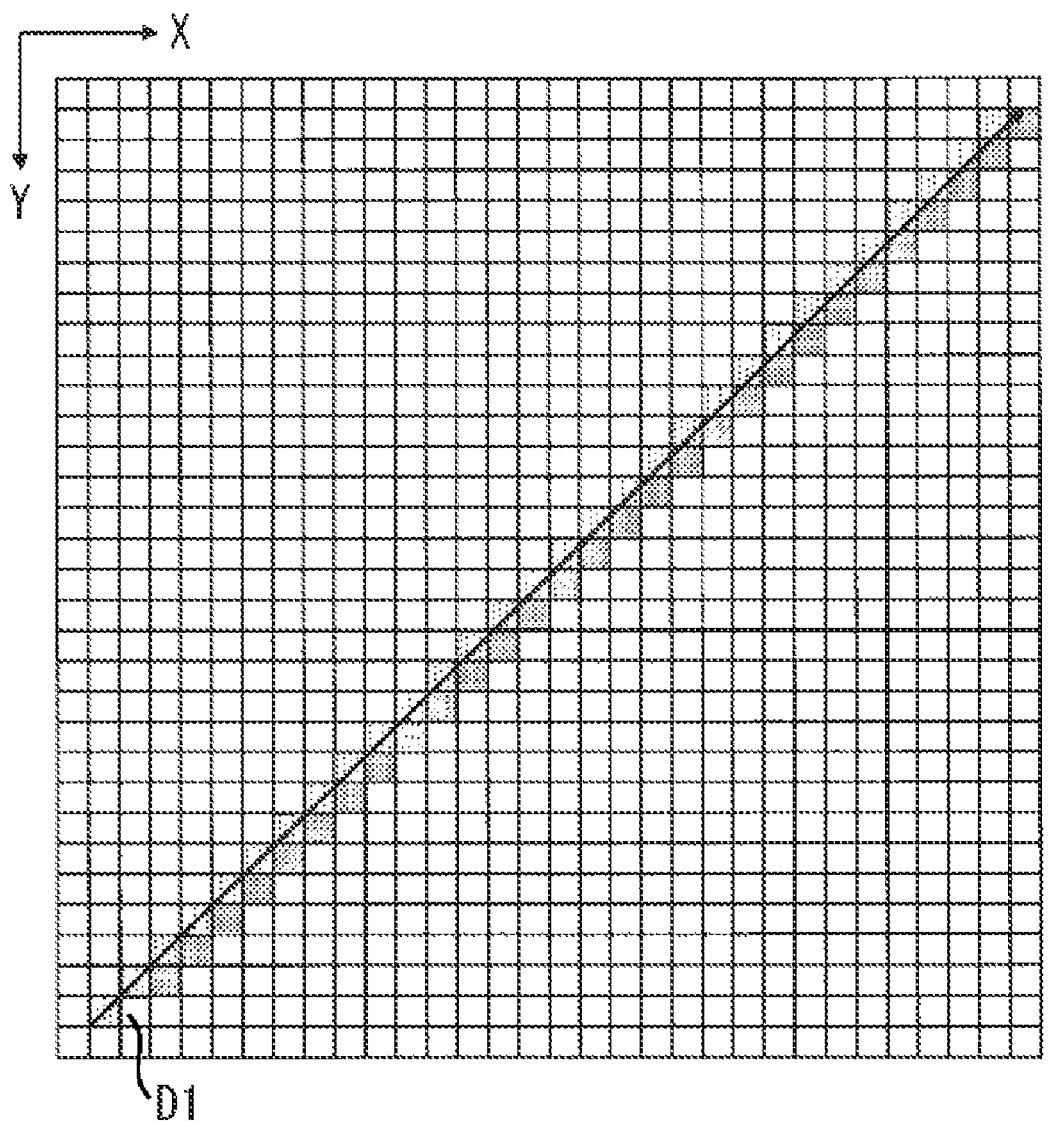
FIG. 8 is a diagram illustrating a defect in the example illustrated in FIG. 7.

A printing device capable of printing on large paper, such as a large-format printer, has become widespread in recent years, and a thin line that passes through many grid points may be rendered, as illustrated in FIG. 7. In such a case, in the above-mentioned exemplary embodiment, the amount of displacement of the end point is small. As a consequence, even if the end point is displaced, as illustrated in FIG. 8, it would appear that the thin line passes through the grid points in the vicinity of the other end point (starting point) in numerical processing, and it may occur that a dot D1 cannot be rendered.

Figure 9:
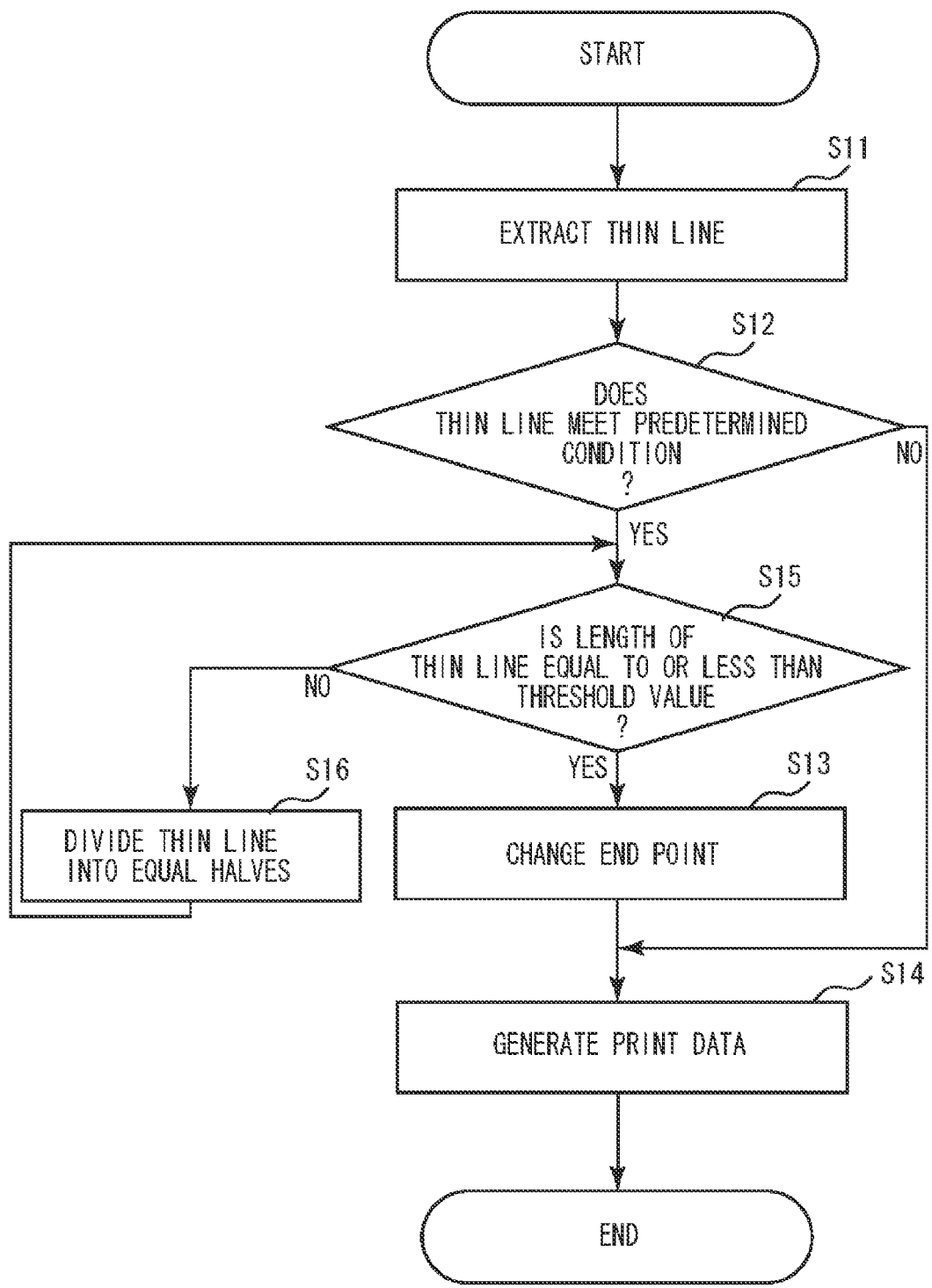
FIG. 9 is a flowchart illustrating processing to resolve the defect in the example illustrated in FIG. 7.

Thus, if a length of the thin line is equal to or less than a predetermined threshold value, it is useful to perform above described processing of the present exemplary embodiment. If not, however, it is useful to divide the thin line until the length becomes equal to or less than the threshold value, and then to perform above described processing of the present exemplary embodiment. In other words, as illustrated in step S15 in FIG. 9, the thin line determination unit 15 determines whether the length of the thin line that satisfies the predetermined condition is equal to or less than the threshold value. If not (NO in step S15), then, it is useful that in step S16, the thin line conversion unit 16 divides the thin line into equal halves.

Figure 10:
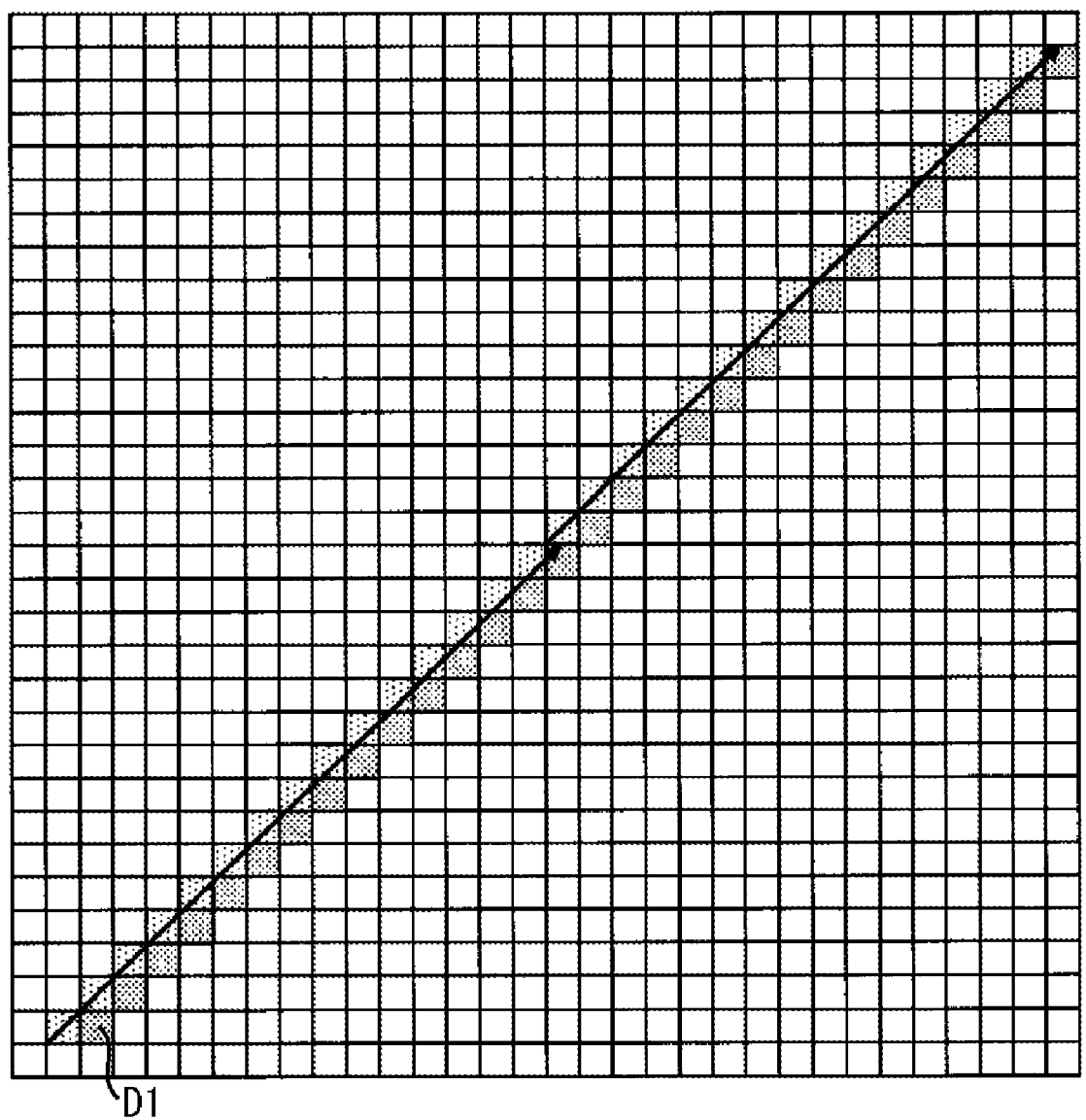
FIG. 10 is a diagram illustrating a result of processing illustrated in FIG. 9.

By performing this processing, the dot D1 that would not be rendered if the processing is not performed will be surely rendered, as illustrated in FIG. 10. Thus the entire thin line can be thickened, and more natural printing result can be obtained.

The threshold value is not particularly limited but in a case of the thin line having a data format of 28.4, a floating-point calculation of 32 bits, and a resolution of 600 dpi, for example, it is suitable to set 15 meters (about 3,543,000 dots) as the threshold value. Although 15 meter is sufficiently large size for a large-format printer, when carrying out further larger output, the thin line can be divided according to the threshold value.

Figure 11A:
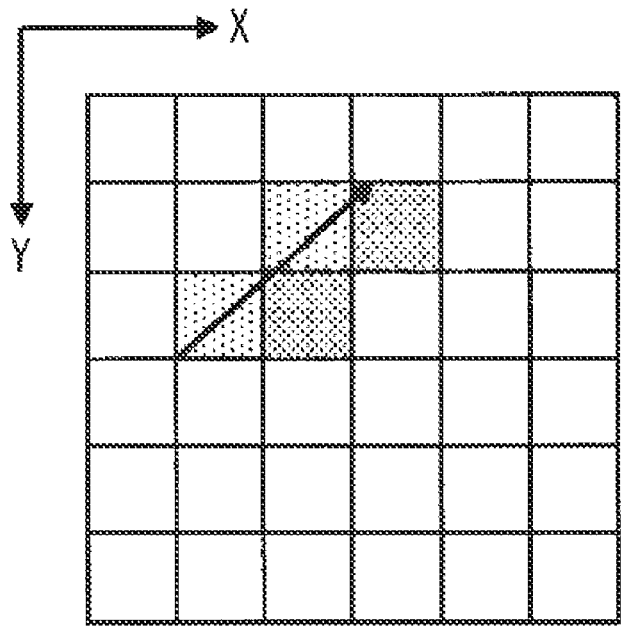
FIGS. 11A and 11B are diagrams illustrating defects due to rotation.
Figure 11B:
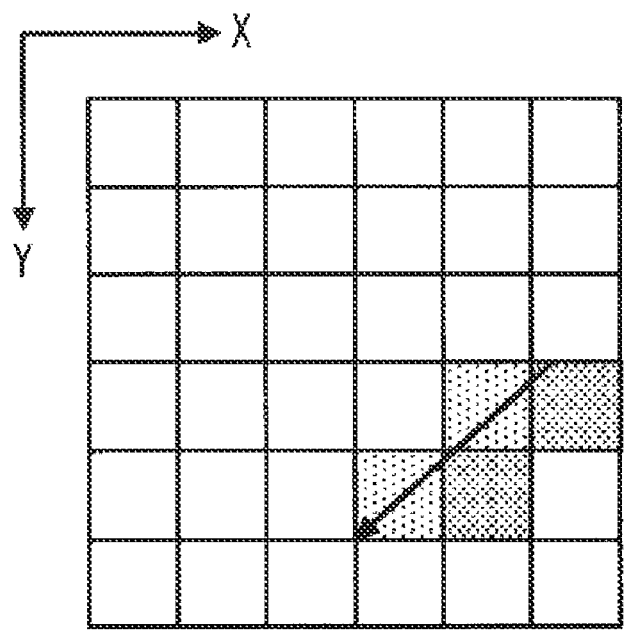

In some printing devices, the user can order to print the thin line by rotating 90 degrees, 180 degrees or 270 degrees with respect to paper via the user interface unit 12. In such a printing device, the printer driver 11, for instance, performs rotation processing during rendering processing. Therefore, when the thin line is thickened after performing the rotation processing, output results may differ depending on presence or absence of the rotation. For example, symmetry of the dots to be rendered has been lost between a case without rotation as illustrated in FIG. 11A, and a case with rotation of 180 degrees as illustrated in FIG. 11B. Therefore, printing results will differ between these cases.

Figure 12A:
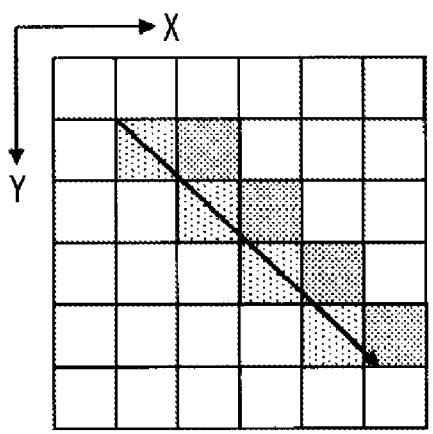
FIGS. 12A to 12D are diagrams illustrating processing to resolve defects in examples illustrated in FIGS. 11A and 11B.
Figure 12B:
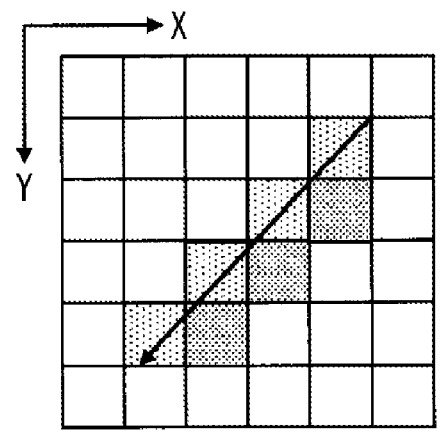
Figure 12C:
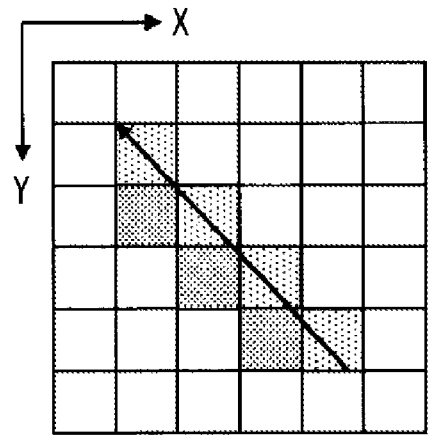
Figure 12D:
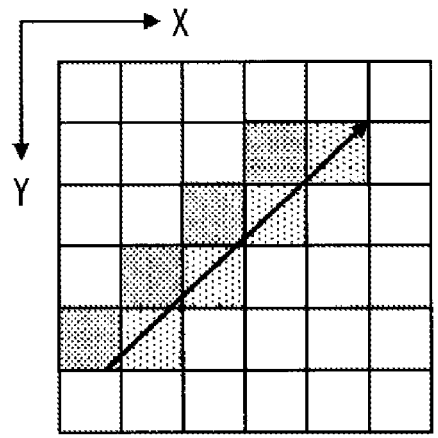
Figure 13:
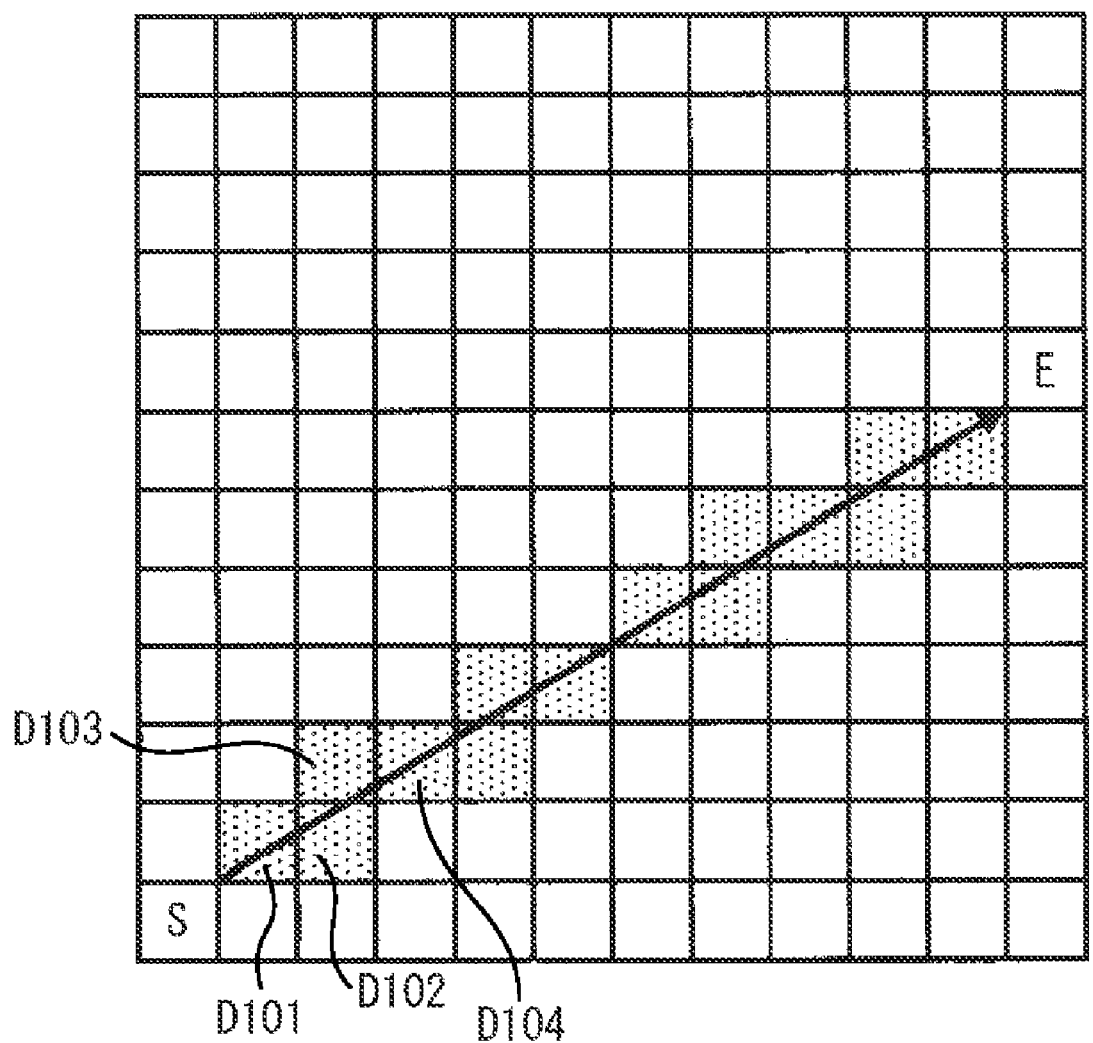
FIG. 13 is a diagram illustrating a rendering method of a thin line by the PostScript Edge system.
Figure 14:
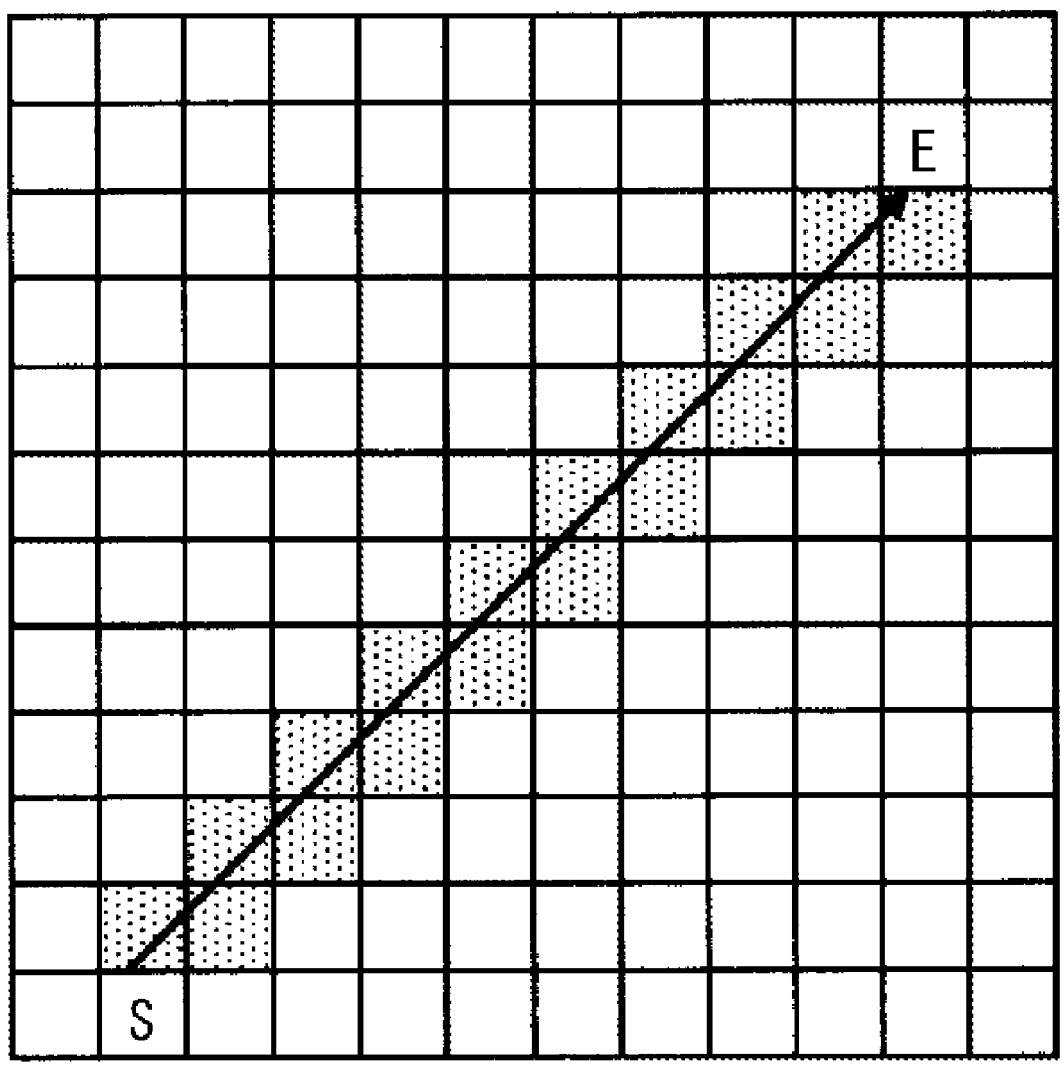
FIG. 14 is a diagram illustrating a thin 45-degree line that does not pass through grid points.
Figure 15:
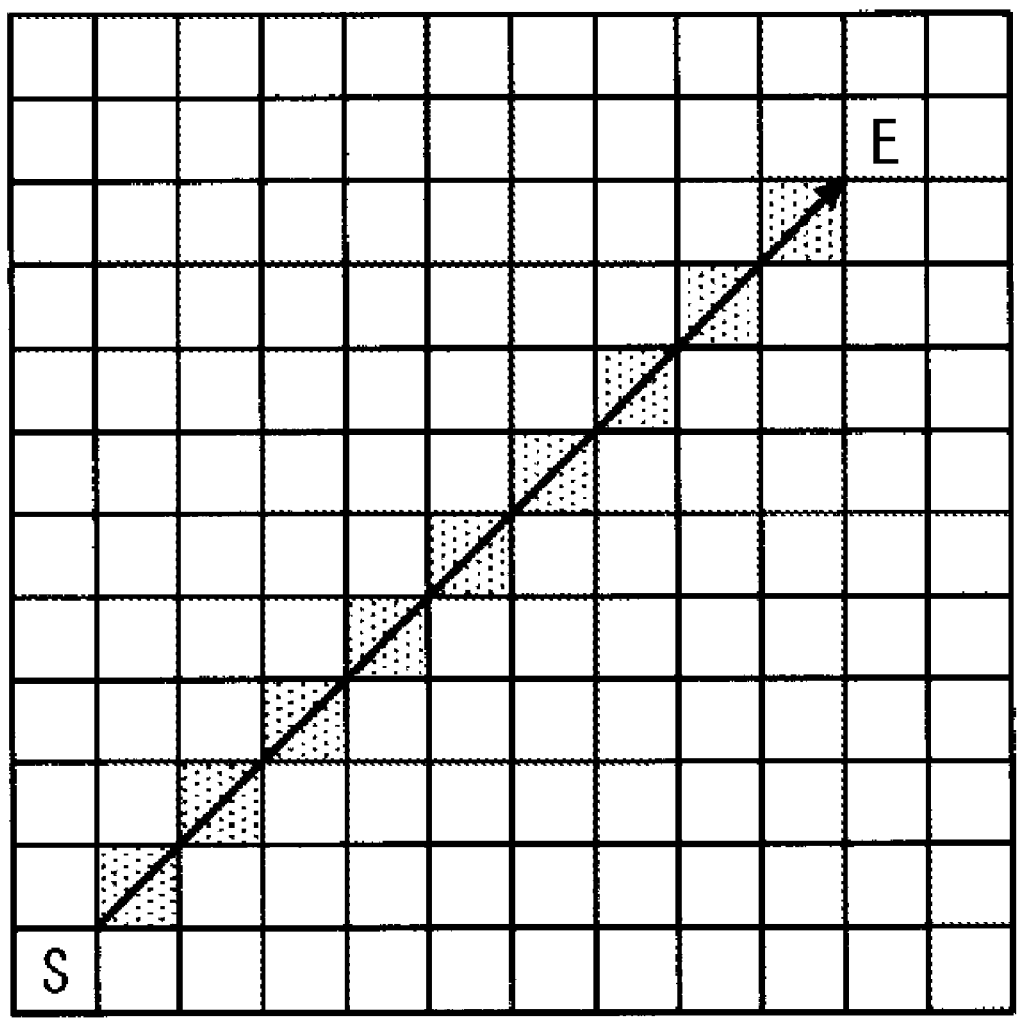
FIG. 15 is a diagram illustrating a thin 45-degree line that passes through grid points.
Figure 16:
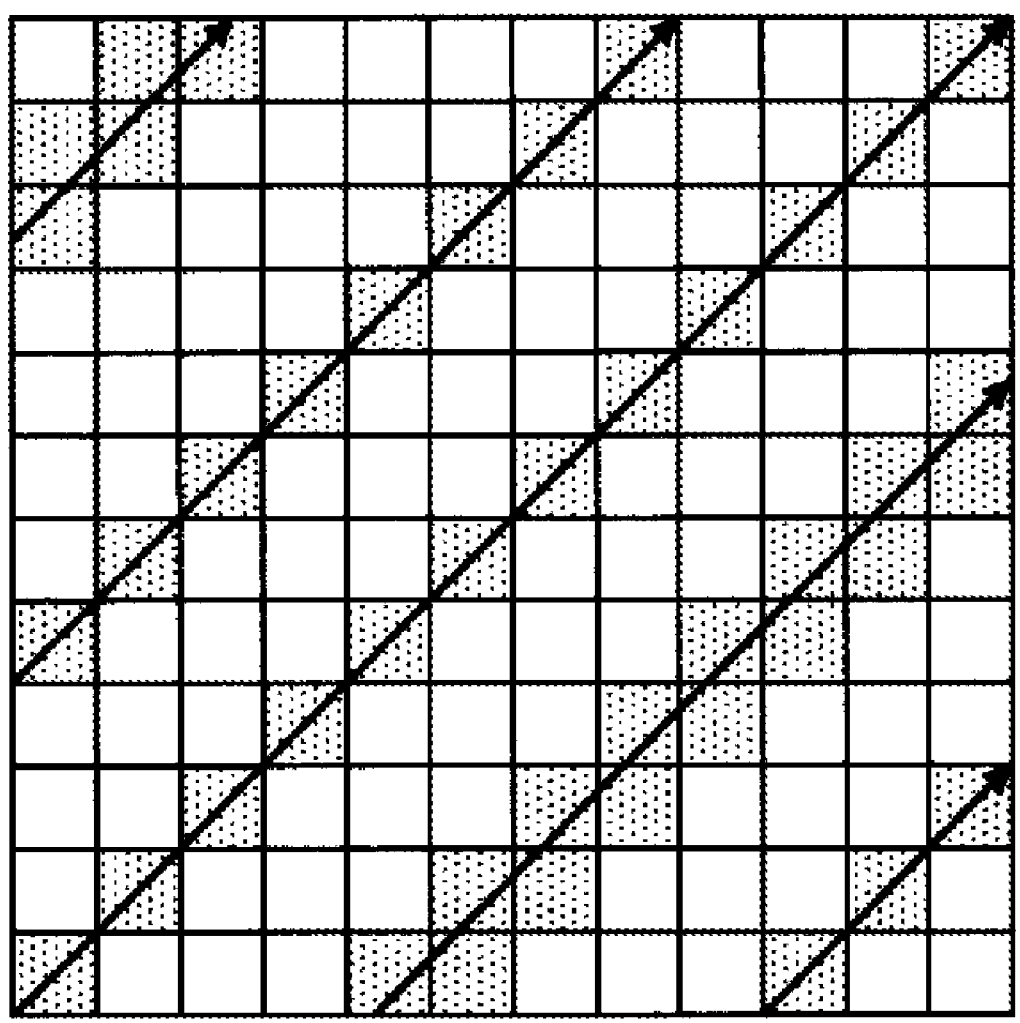
FIG. 16 is a diagram illustrating defects when a plurality of thin 45-degree lines exist.
Figure 17:
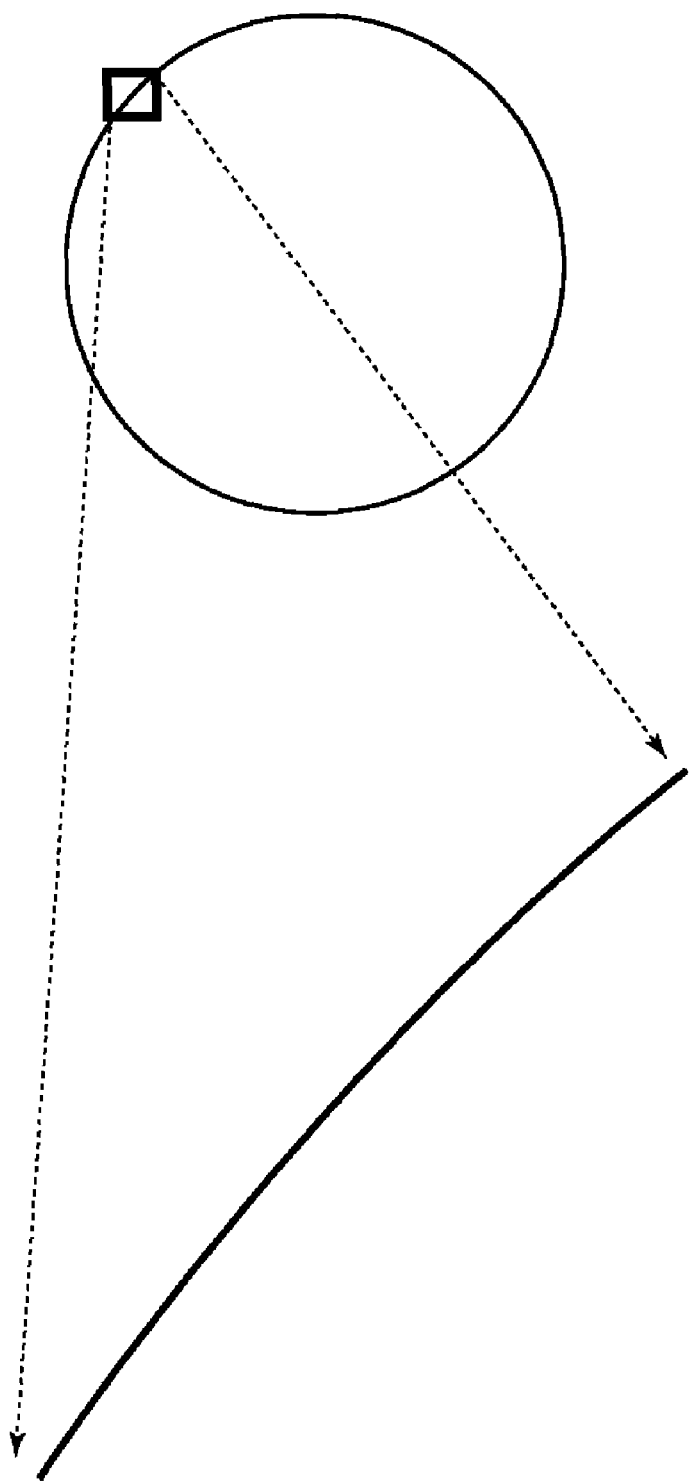
FIG. 17 is a diagram illustrating a variation in thickness of a thin line that occurs when a curve is rendered.

When the rotation processing is performed during printing, it is useful to appropriately select the end point to be displaced and a direction of displacement. For example, it is assumed that a thin line extends without rotation in both positive directions in the vertical axis direction (Y-axis direction) and in the horizontal axis direction (X-axis direction), and the end point (ending point) which has a larger coordinate than the other end point in the vertical axis direction is displaced in the positive direction of the horizontal axis to thicken the thin line, as illustrated in FIG. 12A. When the thin line is rotated 90 degrees clockwise, the end point (ending point) which has the larger coordinate in the vertical axis direction is displaced in the positive direction of the horizontal axis, as illustrated in FIG. 12B. Further, when the thin line is rotated 180 degrees clockwise, the end point (starting point) which has the larger coordinate in the vertical axis direction is displaced in the negative direction of the horizontal axis, as illustrated FIG. 12C. Furthermore, when the thin line is rotated 270 degrees clockwise, the end point (starting point) which has the larger coordinate in the vertical axis direction is displaced in the negative direction of the horizontal axis, as illustrated in FIG. 12D. By appropriately selecting the end point and the direction of displacement, the thin line will always be thickened to a left side relative to its extending direction. Therefore, a stable printing result can be obtained regardless of rotation during printing.

The rotation processing illustrated in FIGS. 12A to 12D are provided as only examples. When the thin line is rotated 90 degrees clockwise, for example, the end point (starting point) which has a smaller coordinate than the other end point in the vertical axis direction may be displaced in the positive direction of the horizontal axis. Moreover, when the thin line is rotated 180 degrees clockwise, the end point (ending point) with the smaller coordinate in the vertical axis direction may be displaced in the negative direction of the horizontal axis. Likewise, when the thin line is rotated 270 degrees clockwise, the end point (ending point) with the smaller coordinate in the vertical axis direction may be displaced in the negative direction of the horizontal axis. In this manner, the endpoint to be displaced and the direction of displacement are not determined uniquely, but it is desirable to select the end point and the direction in consideration of their statuses before rotation.

Image processing for thickening a thin line may be performed outside the printer driver 11. The image processing may be performed by the printing device 7, for example. In such a case, the controller unit 21 will mainly perform the image processing. Also, the CPU within the display device 5 and an application that can perform bit map processing within the client computer may perform the image processing.

The exemplary embodiments of the present invention can be implemented, for example, by executing a program by a computer. Also, a unit for supplying the program to the computer, for example, a computer-readable storage medium, such as a CD-ROM that has recorded the program, or a transmission medium, such as Internet for transmitting the program can be applied as the exemplary embodiments of the present invention. In addition, the above described program can be applied as the exemplary embodiments of the present invention. The above described program, computer-readable storage medium, transmission medium and program product are included in the scope of the present invention.

According to the exemplary embodiments of the present invention, thickness of a thin line can be adjusted by only displacing an end point of a predetermined thin line, so that the processing can be simplified.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-040555 filed Feb. 21, 2008, which is hereby incorporated by reference herein in its entirety.

What is claimed is:

1. An image processing apparatus comprising:
a reception unit configured to receive rendering data;
an extraction unit configured to extract a thin line with a width of equal to or less than a predetermined value from the rendering data received by the reception unit; and
an end point processing unit configured to displace, by a predetermined amount, one end point of the thin line with a width of equal to or less than the predetermined value which has been extracted by the extraction unit from the rendering data received by the reception unit.

2. The image processing apparatus according to claim 1, further comprising a rotation unit configured to rotate the thin line, wherein the end point processing unit determines a direction in which the end point is to be displaced according to a rotation direction, in displacing the end point.

3. The image processing apparatus according to claim 1, wherein an inclination of the thin line is 45 degrees or 135 degrees.

4. The image processing apparatus according to claim 1, further comprising:
a dividing unit configured to divide the thin line in a case where a length of the thin line exceeds a threshold value.

5. A method for processing an image comprising:
receiving rendering data;
extracting a thin line with a width of equal to or less than a predetermined value from the rendering data received in the receiving step; and
displacing, by a predetermined amount, one end point of the thin line with a width of equal to or less than the predetermined value which has been extracted in the extracting step from the rendering data received in the receiving step, wherein the displacing is performed using a processor.

6. The method according to claim 5, wherein an inclination of the thin line is 45 degrees or 135 degrees.

7. The method according to claim 5, further comprising:
dividing the thin line in a case where a length of the thin line exceeds a threshold value.

8. A non-transitory computer-readable storage medium storing a program that causes a computer to execute a method for processing an image, the method comprising:
receiving rendering data;
extracting a thin line with a width of equal to or less than a predetermined value from the rendering data received in the receiving step; and
displacing, by a predetermined amount, one end point of the thin line with a width of equal to or less than the predetermined value which has been extracted in the extracting step from the rendering data received in the receiving step.

9. The non-transitory computer-readable storage medium according to claim 8, wherein an inclination of the thin line is 45 degrees or 135 degrees.

10. The non-transitory computer-readable storage medium according to claim 8, the method for processing an image further comprising:
dividing the thin line in a case where a length of the thin line exceeds a threshold value.

11. An image processing apparatus comprising:
a reception unit configured to receive rendering data;
a determination unit configured to determine whether a thin line to be rendered is at a predetermined angle, the thin line being extracted from the rendering data received by the reception unit;

a generation unit configured to, when the determination unit determines that the thin line is not at the predetermined angle, generate bit map data without displacing an end point of the thin line extracted from the rendering data received by the reception unit, and when the determination unit determines that the thin line is at the predetermined angle, displace at least one of the end points of the thin line extracted from the rendering data received by the reception unit and generate the bit map data; and a transmission unit configured to transmit the bit map data generated by the generation unit to a printing apparatus.

12. The image processing apparatus according to claim 11, further comprising a dividing unit configured to divide the thin line to be rendered when a length thereof is not equal to or less than a threshold value, wherein with respect to the thin line divided by the dividing unit, the generation unit generates the bit map data without displacing the end point of the thin line when the determination unit determines that the thin line is not at the predetermined angle, and displaces at least one of the end points of the thin line to generate the bit map data when the determination unit determinates that the thin line is at the predetermined angle.

13. A method for processing an image comprising:
receiving rendering data;
determining whether a thin line to be rendered is at a predetermined angle, the thin line being extracted from the rendering data received in the receiving step;
generating bit map data without displacing an end point of the thin line extracted from the rendering data received in the receiving step when it is determined that the thin line is not at the predetermined angle, and displacing, using a processor, at least one of the end points of the thin line extracted from the rendering data received in the receiving step to generate the bit map data when it is determined that the thin line is at the predetermined angle; and
transmitting the bit map data generated in the generating step to a printing apparatus.

14. The method according to claim 13, further comprising:
dividing the thin line to be rendered when a length thereof is not equal to or less than a threshold value; and
with respect to the divided thin line, generating the bit map data without displacing the end point of the thin line when it is determined that the thin line is not at the predetermined angle, and displacing at least one of the end points of the thin line to generate the bit map data when it is determined that the thin line is at the predetermined angle.

15. A non-transitory computer-readable storage medium storing a program that causes a computer to execute a method for processing an image, the method comprising:
receiving rendering data;
determining whether a thin line to be rendered is at a predetermined angle, the thin line being extracted from the rendering data received in the receiving step;
generating bit map data without displacing an end point of the thin line extracted from the rendering data received in the receiving step when it is determined that the thin line is not at the predetermined angle, and displacing at least one of the end points of the thin line extracted from the rendering data received in the receiving step to generate the bit map data when it is determined that the thin line is at the predetermined angle; and
transmitting the bit map data generated in the generating step to a printing apparatus.

16. The non-transitory computer-readable storage medium according to claim 15, the method for processing an image further comprising:
dividing the thin line to be rendered when a length thereof is not equal to or less than a threshold value; and
with respect to the divided thin line, generating the bit map data without displacing the end point of the thin line when it is determined that the thin line is not at the predetermined angle, and displacing at least one of the end points of the thin line to generate the bit map data when it is determined that the thin line is at the predetermined angle.

* * * * *